United States Patent
Yamagishi et al.

(10) Patent No.: US 12,439,057 B2
(45) Date of Patent: Oct. 7, 2025

(54) CODING PARAMETER DERIVING APPARATUS, CODING PARAMETER DERIVING METHOD AND PROGRAM

(71) Applicant: NTT, Inc., Tokyo (JP)

(72) Inventors: Kazuhisa Yamagishi, Tokyo (JP); Pierre Lebreton, Tokyo (JP)

(73) Assignee: NTT, Inc., Tokyo (JP)

( * ) Notice: Subject to any disclaimer, the term of this patent is extended or adjusted under 35 U.S.C. 154(b) by 0 days.

(21) Appl. No.: 18/262,811

(22) PCT Filed: Mar. 5, 2021

(86) PCT No.: PCT/JP2021/008731
§ 371 (c)(1),
(2) Date: Jul. 25, 2023

(87) PCT Pub. No.: WO2022/185534
PCT Pub. Date: Sep. 9, 2022

(65) Prior Publication Data
US 2024/0107027 A1    Mar. 28, 2024

(51) Int. Cl.
*H04N 7/12* (2006.01)
*H04N 19/115* (2014.01)
*H04N 19/154* (2014.01)

(52) U.S. Cl.
CPC ......... *H04N 19/154* (2014.11); *H04N 19/115* (2014.11)

(58) Field of Classification Search
CPC .................... H04N 19/154; H04N 19/115
USPC ..................................... 375/240.02
See application file for complete search history.

(56) References Cited

U.S. PATENT DOCUMENTS

| | | | |
|---|---|---|---|
| 10,735,742 B2* | 8/2020 | Petajan | H04N 19/154 |
| 11,284,140 B2* | 3/2022 | Bampis | H04N 21/251 |
| 2011/0246661 A1* | 10/2011 | Manzari | H04L 65/1101 709/231 |
| 2017/0026694 A1* | 1/2017 | Bai | H04N 21/845 |
| 2020/0314503 A1* | 10/2020 | Wang | H04N 21/2402 |
| 2023/0069178 A1* | 3/2023 | Sen | H04L 47/38 |

OTHER PUBLICATIONS

Yusuke Sakamoto et al., "Internet based on subjective image quality Video Image Compression Coding for Movie Distribution", The Institute of Image Image information and Television Engineers, vol. 42, No. 34, pp. 1-6, Oct. 12, 2018.
J. De Cock et al., "Complexity-based consistent-quality encoding in the cloud," 2016 IEEE International Conference on Image Processing (ICIP), Phoenix, AZ, 2016, pp. 1484-1488, doi: 10.1109/ICIP.2016.7532605.

* cited by examiner

*Primary Examiner* — Gims S Philippe
(74) *Attorney, Agent, or Firm* — IPUSA, PLLC

(57) ABSTRACT

An encoding parameter deriving apparatus for improving video delivery quality is provided. The encoding parameter deriving includes: a relationship deriving unit that calculates a value of an index indicating a quality of experience of a viewer for each of a plurality of encoded videos generated by encoding an original video by a plurality of combinations of values of encoding parameters, and derives a relationship between the values of the encoding parameters and the values of the index; and a possibility deriving unit that derives a plurality of possibilities for a combination of values of the encoding parameters to be used for encoding the original video, based on the relationship.

5 Claims, 10 Drawing Sheets

FOR EACH PAST VIEW

Fig. 6

FOR EACH PAST VIEW

| RESOLUTION | FRAME RATE | BIT RATE | QoE |
|---|---|---|---|
| 2160 | 60 | $b_5$ | $Q_5$ |
| 2160 | 60 | $b_4$ | $Q_4$ |
| 1080 | 30 | $b_3$ | $Q_3$ |
| 1080 | 30 | $b_2$ | $Q_2$ |
| 720 | 30 | $b_1$ | $Q_1$ |
| 720 | 30 | $b_0$ | $Q_0$ |

CODING PARAMETER DERIVING APPARATUS, CODING PARAMETER DERIVING METHOD AND PROGRAM

TECHNICAL FIELD

The present invention relates to an encoding parameter deriving apparatus, an encoding parameter deriving method, and a program.

BACKGROUND ART

Video communication services for transferring video media including video and audio (hereinafter, also including voice) between terminals or between a server and a terminal via the Internet have become widespread (examples of such services include IPTV, adaptive streaming (for example, HLS and MPEG-DASH), web conference, and the like).

The Internet is a network in which communication quality is not necessarily guaranteed, and thus in a case where communication is performed by use of voice media, video media, or the like, a bit rate is lowered due to a narrow line bandwidth between a viewer terminal and the network, or a packet loss, packet transfer delay, or packet retransmission occurs due to line congestion, which deteriorates the quality of the voice media, the video media, or the like perceived by a viewer.

Specifically, an original video is encoded because a video cannot be delivered at an excessive bit rate via the network. When the original video is encoded, a video signal in a frame is deteriorated by processing in units of blocks, or a high frequency component of the video signal is lost, which lowers the definition of the entire video. Furthermore, the delivery bit rate cannot be secured, which lowers the resolution of the video and lowers the definition, or lowering the frame rate disables the continuity of the video from being secured, which makes the video discontinuous. In addition, if a packet loss or packet discarding occurs when the encoded video data is transmitted as a packet to the viewer terminal via the network, deterioration occurs in a frame or a throughput or the like is lowered, and thus the packet is not received by a reproduction timing. In this case, a data buffer amount in the viewer terminal becomes insufficient, and thus the reproduction of the video stops.

Similarly, in the case of audio, original audio is encoded because audio cannot be delivered at an excessive bit rate via the network, and when the original audio is encoded, a high-frequency component of the audio is lost, which causes the clarity of the audio to be lost. As in the case of a video, if a packet loss or packet discarding occurs when the encoded audio data is transmitted as a packet to the viewer terminal via the network, distortion occurs in the audio or a throughput or the like is lowered, and thus the packet is not received by a reproduction timing. In this case, a data buffer amount in the viewer terminal becomes insufficient, and thus the reproduction of the audio stops.

As a result, the viewer perceives video deterioration and audio deterioration, and perceives degradation in audiovisual quality.

Therefore, it is important to encode voice and video media according to the network quality and deliver the voice and video data to the viewer.

CITATION LIST

Non Patent Literature

Non Patent Literature 1: J. De Cock, Z. Li, M. Manohara and A. Aaron, "Complexity-based consistent-quality encoding in the cloud," 2016 IEEE International Conference on Image Processing (ICIP), Phoenix, A Z, 2016, pp. 1484-1488, doi: 10.1109/ICIP.2016.7532605.

SUMMARY OF INVENTION

Technical Problem

However, in many video-based services, videos encoded with preset sets of a resolution, a frame rate, and a bit rate (for example, in the case of using the expression format of resolution/frame rate @bit rate, 3840×2160/60p @12 Mbps, 1920×10800/30p @3 Mbps, and the like) are often prepared in a delivery server, and delivery is not necessarily performed at a bit rate suitable for a throughput level that can be realized in a current network. Specifically, in a case where the network quality has a throughput of about 10 Mbps, video data accumulated in a buffer of a client will decrease unless a video at a bit rate lower than the throughput is acquired, and thus the client does not select the video of 3840×2160/60p @12 Mbps. As a result, the video of 1920×10800/30p @3 Mbps is always acquired, and a higher quality video delivery cannot be provided.

In addition, as described above, since encoding is performed with predetermined values of the resolution, the frame rate, and the bit rate, the bit rate level cannot be appropriately changed according to the current network quality.

Furthermore, in general, it is known that, even if encoding is performed by use of the same resolution, frame rate, and bit rate, the video quality to be realized differs depending on a source video as described in Non Patent Literature 1, and thus simply preparing a mechanism for increasing or decreasing the bit rate according to the network quality is not sufficient for quality improvement.

Moreover, even if the network quality can be considered, there are a wide variety of rate selection techniques implemented in the client. For example, the bit rate to be acquired is determined according to the throughput level (for example, a video at a bit rate of 70% or less of the throughput is selected), the bit rate to be selected is determined according to the remaining amount of data in a reception buffer of the client, or the bit rate to be selected is determined by use of the throughput and the remaining amount of the buffer in a hybrid manner. If the bit rate of the video is determined depending on the rate selection technique of the client, there is a problem that a method corresponding to the rate selection technique is required.

The present invention has been made in view of the above points, and an object of the present invention is to improve video delivery quality.

Solution to Problem

In order to solve the above problem, an encoding parameter deriving apparatus includes: a relationship deriving unit that calculates a value of an index indicating a quality of experience of a viewer for each of a plurality of encoded videos generated by encoding an original video by a plurality of combinations of values of encoding parameters, and derives a relationship between the values of the encoding parameters and the values of the index; and a possibility deriving unit that derives a plurality of possibilities for a combination of values of the encoding parameters to be used for encoding the original video, based on the relationship.

Advantageous Effects of Invention

It is possible to improve video delivery quality.

DESCRIPTION OF EMBODIMENTS

Figure 1:
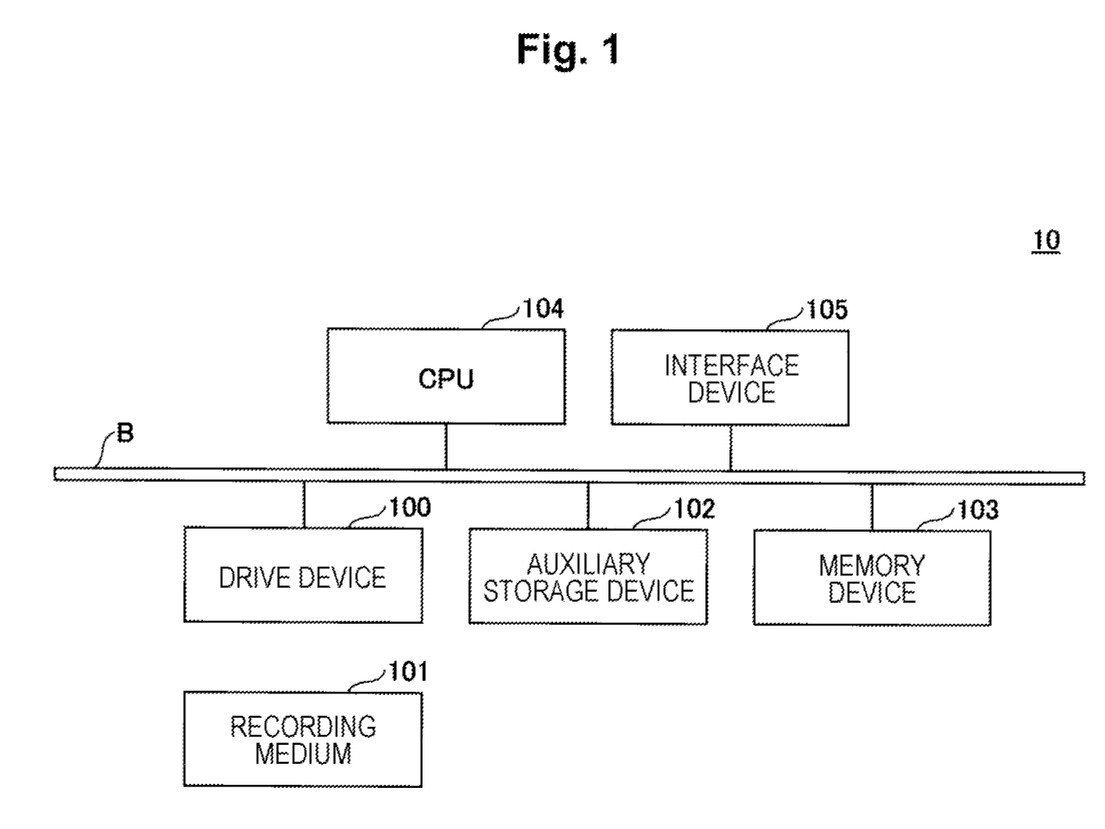
FIG. 1 is a diagram illustrating a hardware configuration example of an encoding parameter deriving apparatus 10 according to an embodiment of the present invention.

Hereinafter, an embodiment of the present invention will be described with reference to the drawings. FIG. 1 is a diagram illustrating a hardware configuration example of an encoding parameter deriving apparatus 10 according to the embodiment of the present invention. The encoding parameter deriving apparatus 10 in FIG. 1 includes a drive device 100, an auxiliary storage device 102, a memory device 103, a CPU 104, an interface device 105, and the like, which are connected to each other via a bus B.

A program for implementing processing in the encoding parameter deriving apparatus 10 is provided by a recording medium 101 such as a CD-ROM. When the recording medium 101 storing the program is set in the drive device 100, the program is installed from the recording medium 101 to the auxiliary storage device 102 via the drive device 100. However, the program is not necessarily installed from the recording medium 101 and may be downloaded from another computer via a network. The auxiliary storage device 102 stores the installed program and also stores necessary files, data, and the like.

In a case where an instruction to start the program is made, the memory device 103 reads the program from the auxiliary storage device 102 and stores the program. The CPU 104 executes a function related to the encoding parameter deriving apparatus 10 according to the program stored in the memory device 103. The interface device 105 is used as an interface for connecting to the network.

Figure 2:
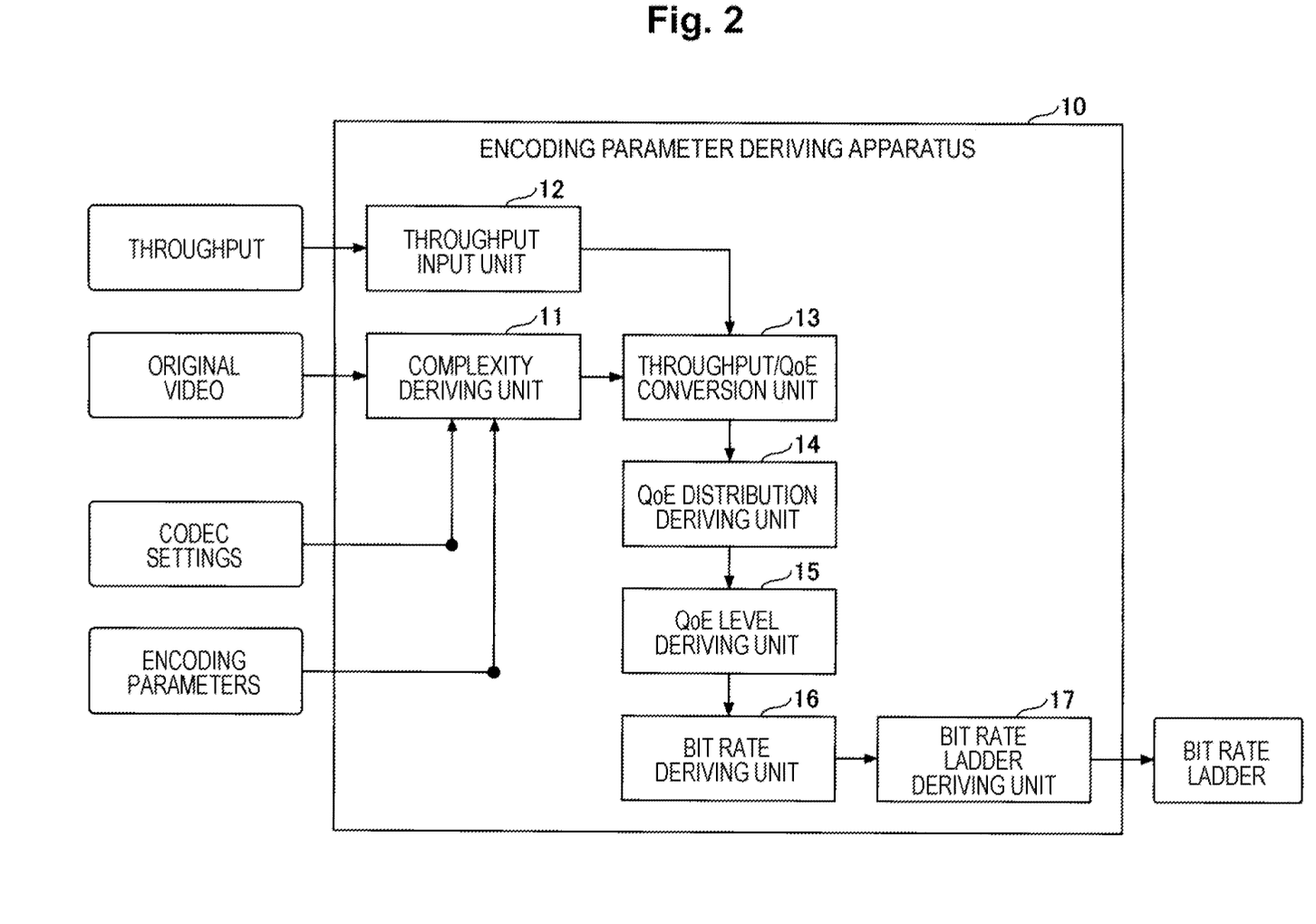
FIG. 2 is a diagram illustrating a functional configuration example of the encoding parameter deriving apparatus 10 according to the embodiment of the present invention.

FIG. 2 is a diagram illustrating a functional configuration example of the encoding parameter deriving apparatus 10 according to the embodiment of the present invention. In FIG. 2, the encoding parameter deriving apparatus 10 includes a complexity deriving unit 11, a throughput input unit 12, a throughput/QoE conversion unit 13, a QoE distribution deriving unit 14, a QoE level deriving unit 15, a bit rate deriving unit 16, and a bit rate ladder deriving unit 17. Each of these units is implemented by processing executed by the CPU 104 by one or more programs installed in the encoding parameter deriving apparatus 10. That is, each of these units is implemented by cooperation of hardware resources of the encoding parameter deriving apparatus 10 and the program (software) installed in the encoding parameter deriving apparatus 10.

Figure 3:
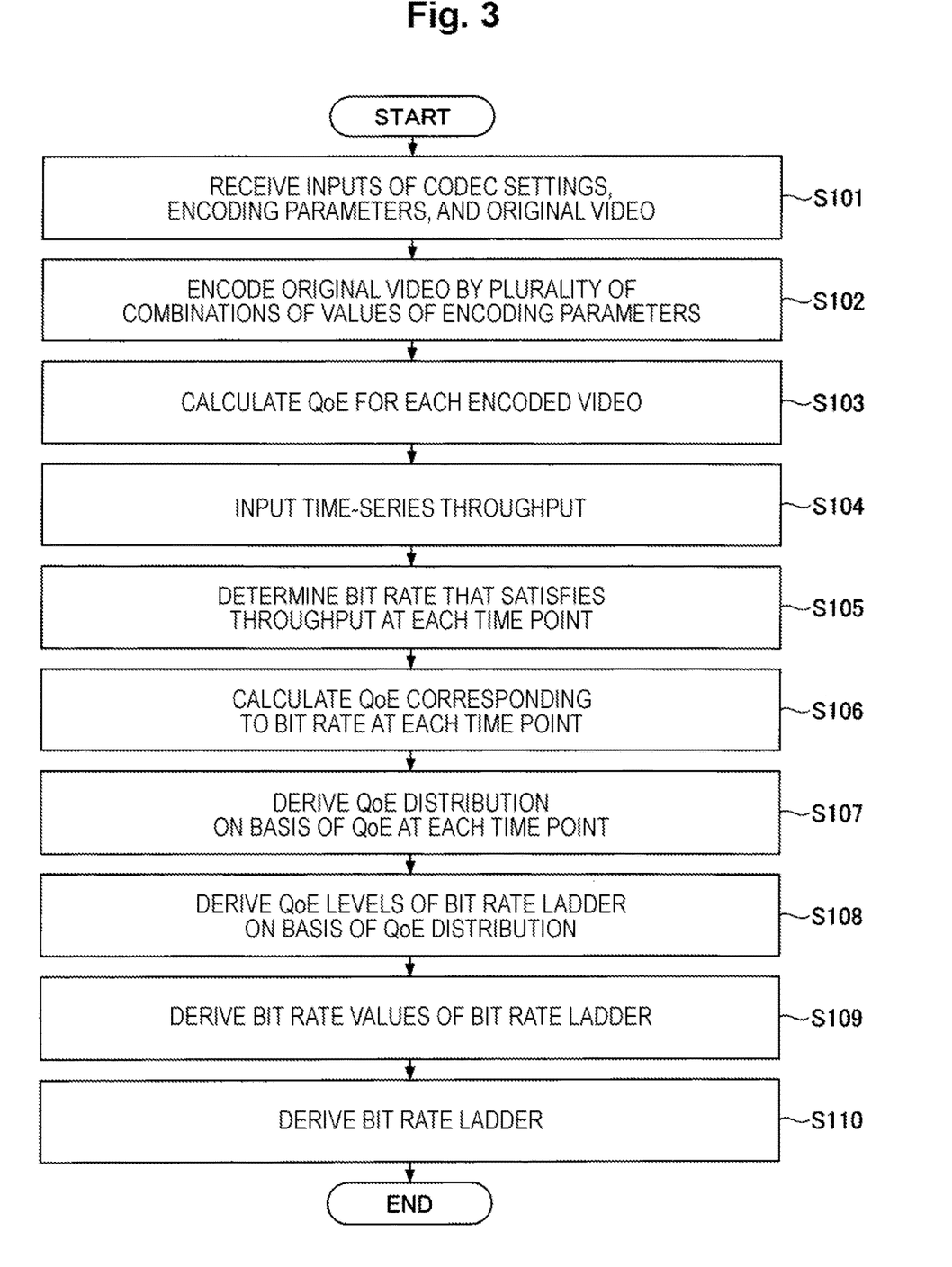
FIG. 3 is a flowchart for describing an example of a processing procedure executed by the encoding parameter deriving apparatus 10.

Hereinafter, a processing procedure executed by the encoding parameter deriving apparatus 10 will be described. FIG. 3 is a flowchart for describing an example of the processing procedure executed by the encoding parameter deriving apparatus 10.

In step S101, the complexity deriving unit 11 receives inputs of one original video (video for about 10 seconds before encoding), codec settings used in a service (for example, a profile, the number of encoding passes, a GoP size, a motion vector search range, and the like), and a plurality of combinations of values of desired encoding parameters (for example, a resolution, a frame rate, and a bit rate). As combinations of values of the encoding parameters, for example, a plurality of bit rates is input for a plurality of sets of resolutions and frame rates. For example, as sets of resolutions and frame rates (hereinafter, expressed in the format of "resolution/frame rate"), 3840×2160/60p, 1920×1080/30p, and 1280×720/30p are input, and "40, 20, 10, and 5 Mbps", "10, 5, 3, and 1 Mbps", and "3, 2, 1, and 0.5 Mbps" are sequentially input as bit rates for these three combinations.

Subsequently, the complexity deriving unit 11 generates videos obtained by encoding the original video by the plurality of combinations of values of the encoding parameters using an encoder for which the coding settings received in step S101 are set (S102). According to the above example, the complexity deriving unit 11 prepares videos of 3840× 2160/60 fps, 1920×1080/30p, and 1280×720/30p, and generates videos encoded at bit rates of "40, 20, 10, and 5 Mbps", "10, 5, 3, and 1 Mbps", and "3, 2, 1, and 0.5 Mbps", respectively (hereinafter, referred to as "encoded videos"). As a result, a plurality of encoded videos is generated.

Subsequently, the complexity deriving unit 11 uses a quality of experience (QoE) estimation technique (for example, Video Multi-method Assessment Fusion (VMAF) (https://github.com/Netflix/vmaf)) capable of evaluating the QoE of a viewer by use of a video signal, to calculate a value of an index indicating (an estimated value of) the QoE (hereinafter, the value is simply referred to as "QoE") for each of the plurality of encoded videos (S103).

Figure 4:
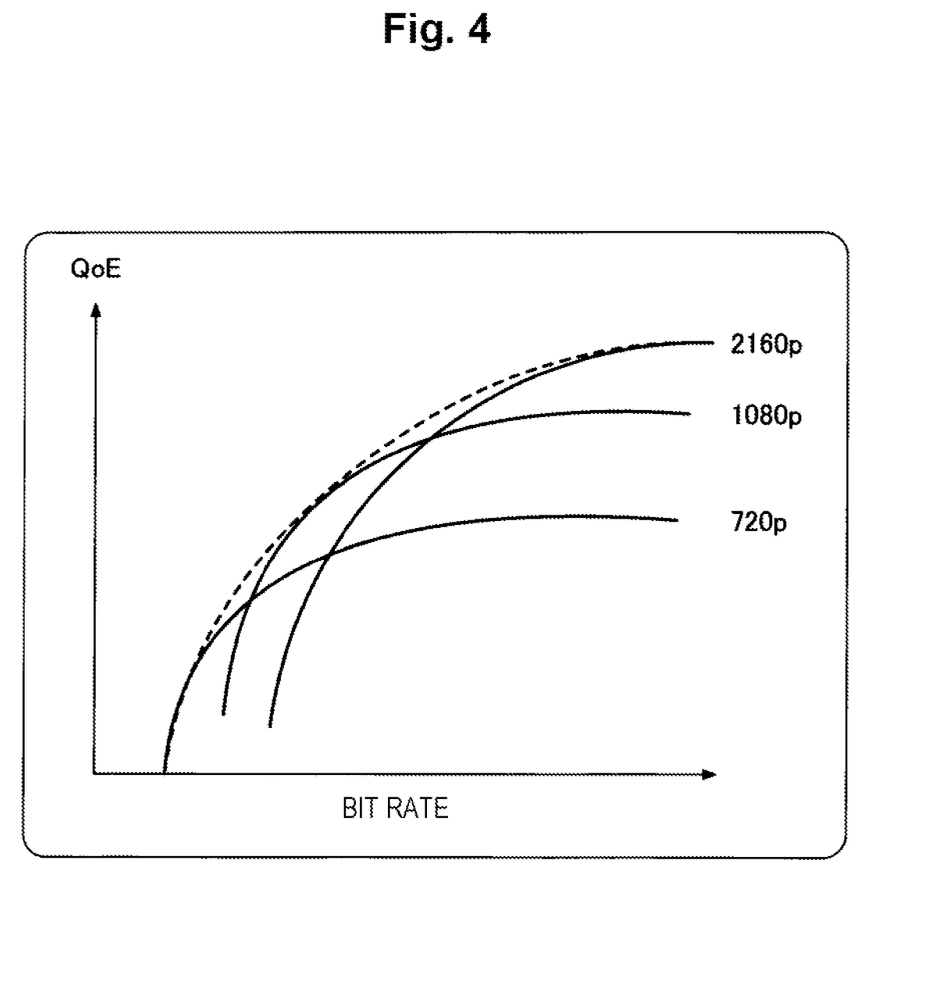
FIG. 4 is a diagram illustrating characteristics of complexity of an original video.

Executing the above processing makes it possible to describe characteristics illustrated in FIG. 4 (the relationship between the values of the encoding parameters and the QoE). Furthermore, drawing a curve so as to obtain the maximum QoE with respect to the bit rate makes it possible to obtain the curve of the broken line in FIG. 4. This broken line is generally called a convex hull. The complexity deriving unit 11 derives a curve indicated by the convex hull. Note that the curve in FIG. 4 can be formulated by use of the following expression (1) or the like. c1, c2, and c3 are constants. In addition, $b_y$ is the bit rate.

[Math. 1]

$$Q = \frac{c_1}{1 + e^{-c_2 \times \log_{10} b_y + c_3}} \tag{1}$$

Figure 5:
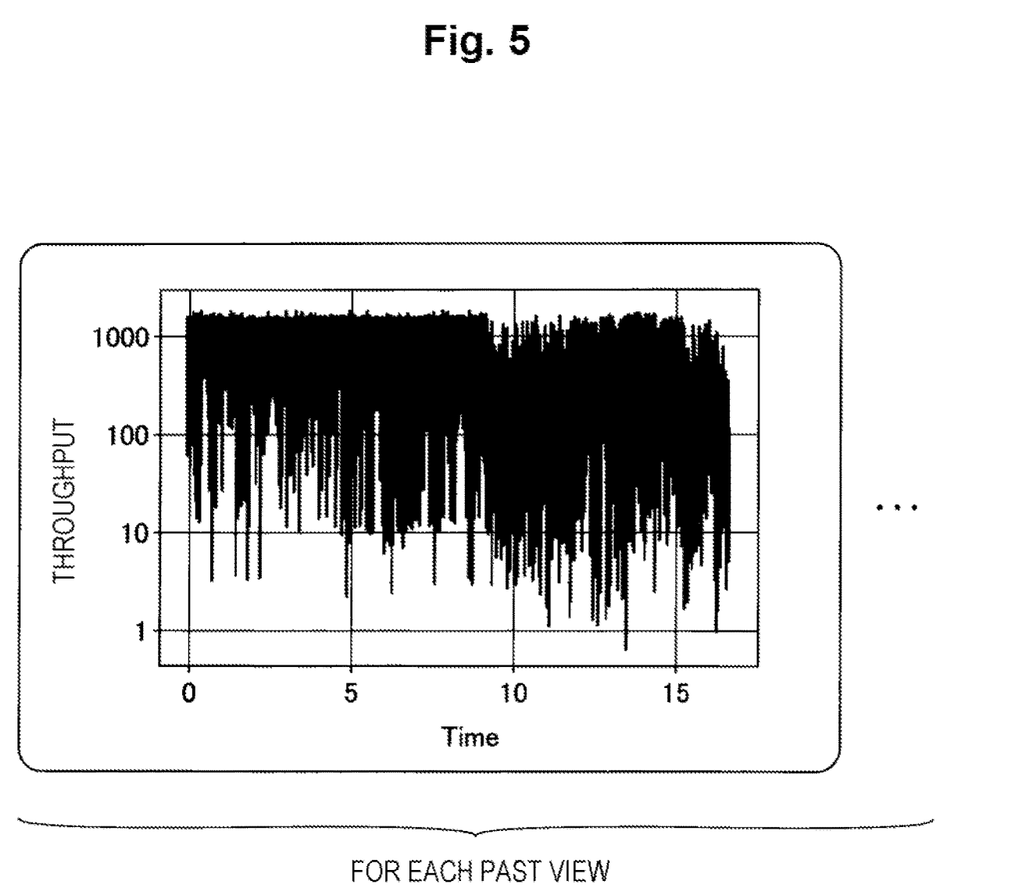
FIG. 5 is a diagram illustrating time-series data of throughput.

In step S104, the throughput input unit 12 inputs time-series data of throughput in a delivery at the time of viewing a certain video in a past certain period. Note that, in a case where viewing (delivery) is performed a plurality of times in the certain period, a plurality of pieces of time-series data may be input. The time axis of each piece of time-series data corresponds to a viewing time of the video. The throughput input unit 12 can obtain characteristics as illustrated in FIG. 5 (the relationship between the viewing time and the throughput) for each past view (delivery) from such time-series data.

In step S105, the throughput/QoE conversion unit 13 determines a bit rate t that satisfies a throughput value t at each time point t of each past view (delivery) on the basis of the characteristics obtained for each past view (delivery) in S104. For example, the throughput/QoE conversion unit 13 sets the throughput value t as the bit rate value t. Alternatively, the throughput/QoE conversion unit 13 sets a value of about 70% of the throughput value t as the bit rate value t as in a bit rate selection algorithm of normal adaptive streaming. In any case, in step S105, time-series data of the bit rate is obtained.

Subsequently, the throughput/QoE conversion unit 13 substitutes the bit rate value t at each time point t of the time-series data of the bit rate, which is obtained for each past view (delivery), for $b_v$ of the expression (1) to calculate a QoE (Qt) corresponding to the bit rate value t (S106). The throughput/QoE conversion unit 13 arranges the obtained Qt (QoE at each time point) in time series to obtain characteristics in FIG. 6. That is, the time-series data of the throughput is converted into the time series data of the QoE in steps S104 to S106.

Figure 6:
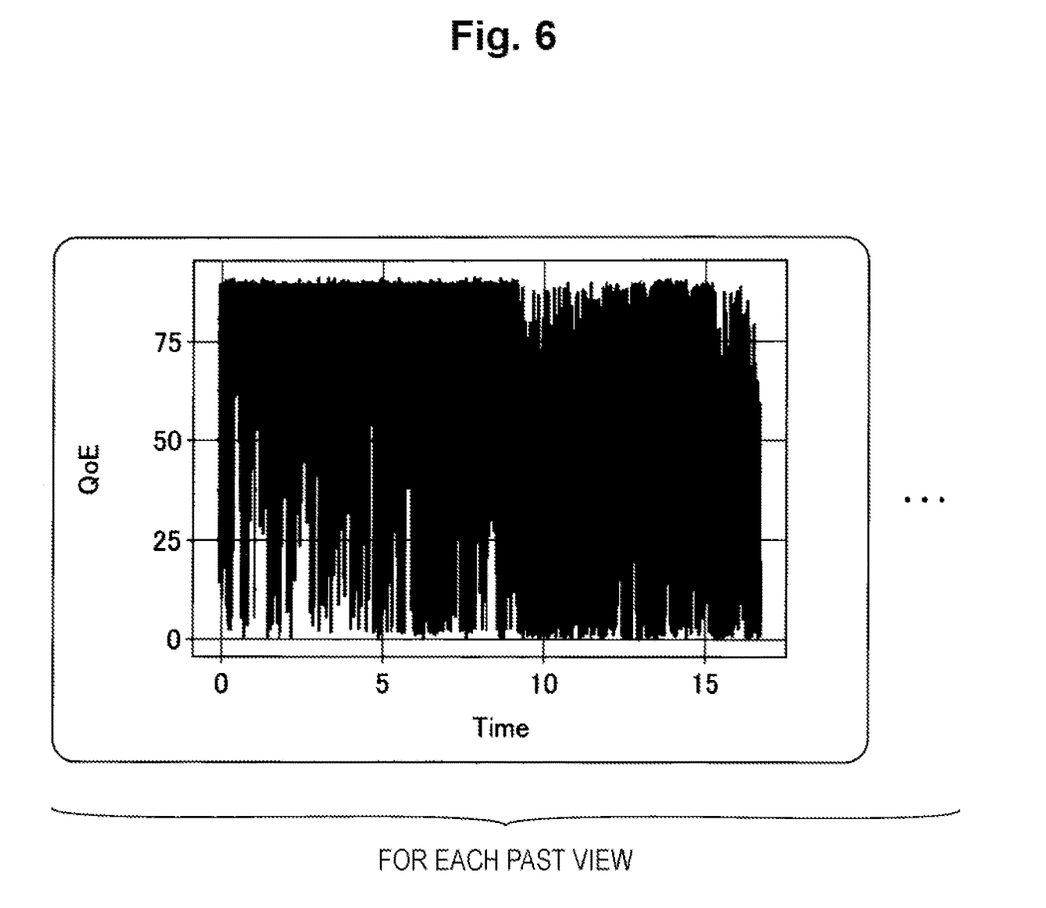
FIG. 6 is a diagram illustrating time-series data of QoE.
Figure 7:
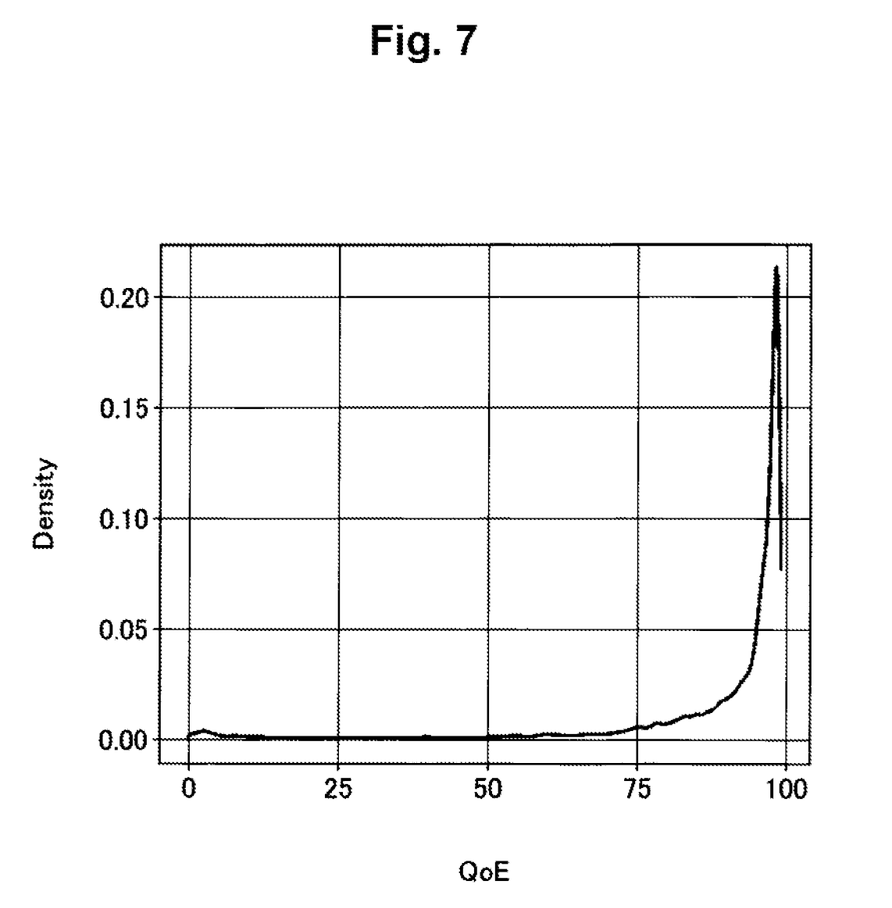
FIG. 7 is a diagram illustrating a QoE distribution.

Subsequently, the QoE distribution deriving unit 14 derives a distribution of the QoE (hereinafter, the distribution is referred to as a "QoE distribution") on the basis of the characteristics in FIG. 6 obtained for all the past views (deliveries) (S107). As a result, characteristics as illustrated in FIG. 7 are obtained. As a result, it is possible to grasp the highest QoE level that can be realized from the past throughput time series. Note that one QoE distribution is obtained for all the past views (deliveries).

Subsequently, the QoE level deriving unit 15 derives QoE levels for setting a bit rate ladder (QoE values corresponding to bit rate values in the bit rate ladder) on the basis of the QoE distribution (S108). Note that the bit rate ladder refers to a plurality of possibilities for a combination of values of the encoding parameters (resolution, frame rate, and bit rate) to be used for encoding the original video.

Such possibilities can be prepared infinitely, but in general, a finite number of possibilities are often set in consideration of the viewpoint of a server storage, and for example, the number of possibilities is often limited to four or five. In addition, even if infinite possibilities are prepared, it is difficult for a user to perceive a difference in quality levels of the possibilities, and it is very inefficient to prepare the infinite possibilities. It is assumed that the number of levels (N) is set in advance, and levels of the QoE distribution (hereinafter, referred to as "QoE levels") are set.

As a method of setting the QoE levels, for example, the levels can be set at equal intervals or the levels can be set by use of a K-means method or the like. Regarding the method of setting of the levels, since it is not beneficial to select levels having no difference in perception quality, it is desirable to select levels so as to generate a difference. For example, in a case of determining L={l1, l2, . . . , lN}, which is N QoEs corresponding to the possibilities of the bit rate ladder, the minimization problem of the following expression (2) is solved.

[Math. 2]

$$e = \sum_t (Q_t - \mathrm{argmin}_{l \in L}(Q_t - l))^2 \quad (2)$$

Figure 8:
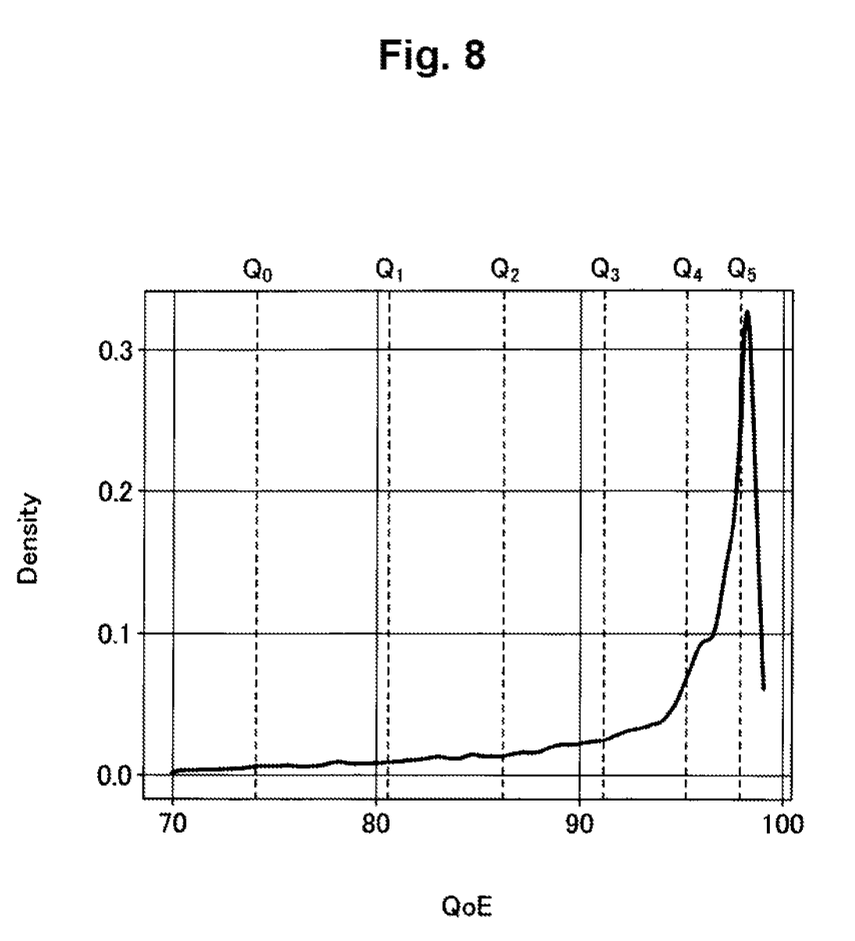
FIG. 8 is a diagram illustrating an example of QoE levels in a bit rate ladder.

In the expression (2), e is defined as a difference between the QoE level having the highest frequency in the QoE distribution and the QoE levels obtained in the ladder. The QoE level deriving unit 15 can determine the QoE levels as indicated by broken lines in FIG. 8 by solving the minimization problem of e.

Subsequently, the bit rate deriving unit 16 derives bit rate values corresponding to the possibilities of the bit rate ladder from the QoE levels (L={l1, l2, . . . , lN}) derived in step S108 and the convex hull in S101 (S109). That is, bit rate values corresponding to the QoE levels in the convex hull are obtained. Specifically, the bit rate ladder deriving unit 17 can derive the bit rate values on the basis of the following expression (3).

[Math. 3]

$$b_i = e^{\frac{\log(10)}{c_2}} \times \left(c_3 - \log\left(\frac{c_1}{l_i} - 1\right)\right) \quad (3)$$

Note that coefficients c1, c2, and c3 have the same values as those in the expression (1). In addition, e is an exponential function. $l_i$ is an i-th QoE level and $b_i$ is a bit rate value corresponding to the i-th QoE level.

Figure 9:
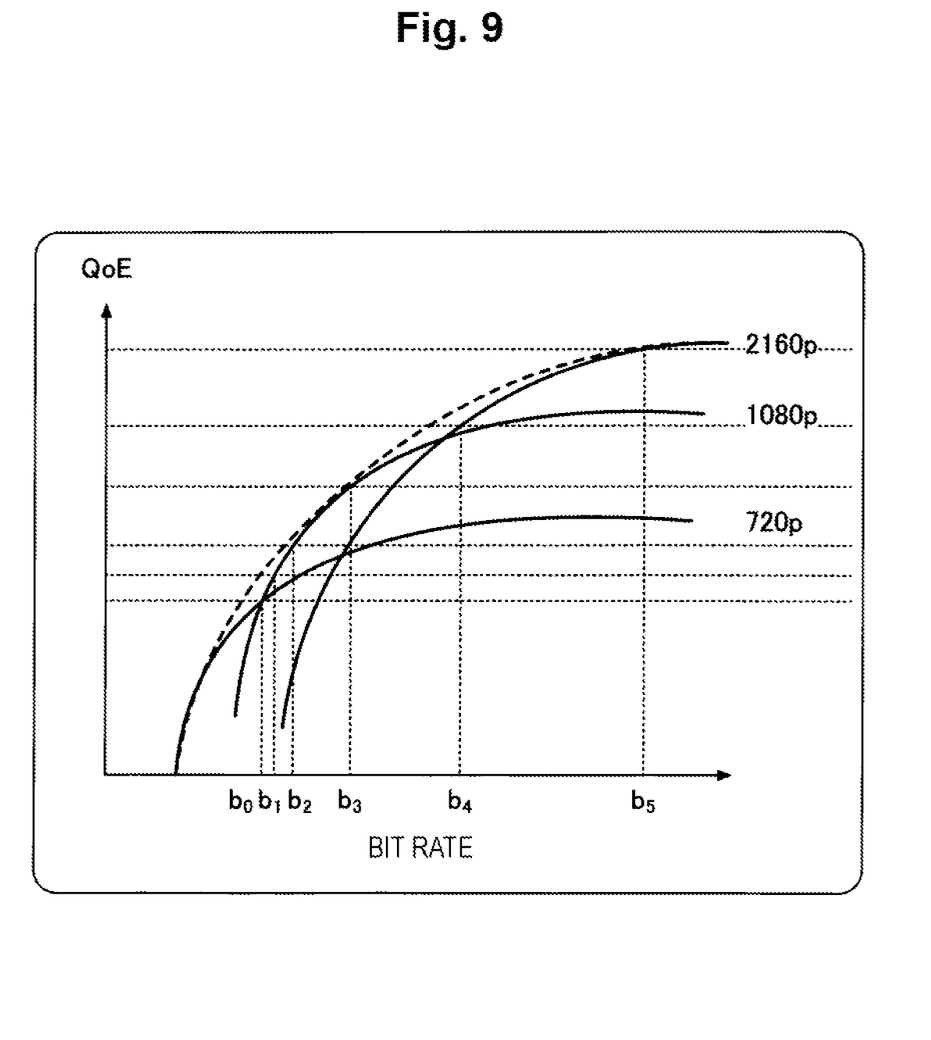
FIG. 9 is a diagram illustrating an example of deriving a resolution and a frame rate in the bit rate ladder.
Figure 10:
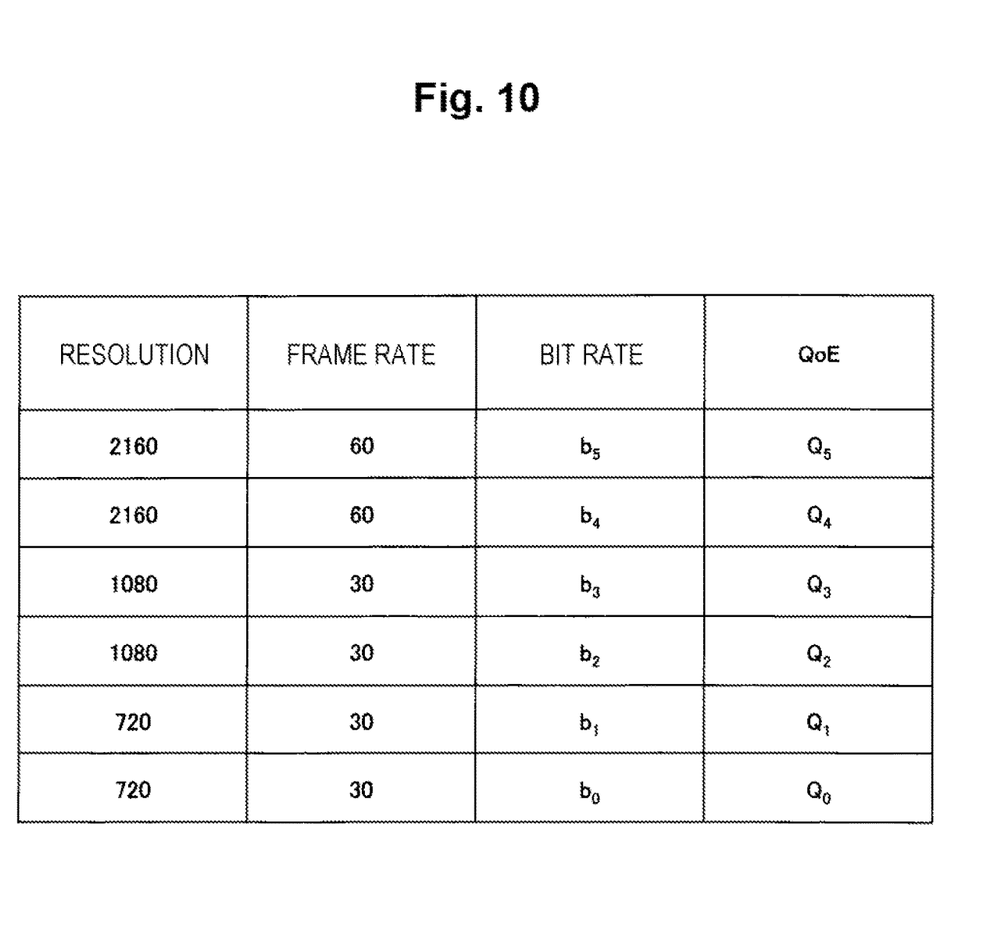
FIG. 10 is a diagram illustrating an example of the bit rate ladder.

Subsequently, the bit rate ladder deriving unit 17 derives a resolution and a frame rate corresponding to each bit rate value on the basis of each bit rate value derived in step S109 and the characteristics in FIG. 4 (S110). Specifically, first, the bit rate ladder deriving unit 17 derives QoEs corresponding to one of the bit rate values on the basis of each curve for a combination of a resolution and a frame rate in FIG. 4. Therefore, QoEs are obtained for each set of a resolution and a frame rate. Subsequently, as illustrated in FIG. 9, the bit rate ladder deriving unit 17 selects, as a resolution and a frame rate corresponding to the bit rate value, a resolution and a frame rate corresponding to the QoE closest to the QoE level corresponding to the bit rate value from among the QoEs each corresponding to a set of a resolution and a frame rate. This processing is performed for each bit rate value of the bit rate ladder, so that a resolution and a frame rate corresponding to each bit rate value are derived. As a result, the bit rate ladder in which the resolution, the frame rate, the bit rate (VBR), and the QoE are associated with each other is obtained as illustrated in FIG. 10.

As described above, according to the present embodiment, using the complexity (characteristics in FIG. 4) of content (original video) and a network throughput in a past certain period makes it possible to derive a bit rate ladder that optimizes the delivery quality, which makes it possible to set the bit rate ladder suitable for the network quality and set a bit rate according to the complexity of the content. As a result, it is possible to improve video delivery quality.

In addition, since the bit rate is determined without use of information of a rate selection technique implemented in a client, this method can be independent of the rate selection technique.

For this reason, it is possible to improve a problem that an encoded video not suitable for an actual network is prepared since only videos encoded on the basis of a predetermined bit rate ladder are conventionally used.

Note that, in the present embodiment, the complexity deriving unit 11 is an example of a relationship deriving unit. The bit rate ladder deriving unit 17 is an example of a possibility deriving unit. The throughput/QoE conversion unit 13 is an example of a conversion unit. The QoE level deriving unit 15 is an example of an index value deriving unit.

Although the embodiment of the present invention has been described in detail above, the present invention is not limited to such a specific embodiment, and various modifications and changes can be made within the scope of the gist of the present invention described in the claims.

REFERENCE SIGNS LIST

10 Encoding parameter deriving apparatus
11 Complexity deriving unit
12 Throughput input unit
13 Throughput/QoE conversion unit
14 QoE distribution deriving unit
15 QoE level deriving unit
16 Bit rate deriving unit
17 Bit rate ladder deriving unit
100 Drive device
101 Recording medium
102 Auxiliary storage device
103 Memory device
104 CPU
105 Interface device
B Bus

The invention claimed is:

1. An encoding parameter deriving apparatus comprising:
a processor; and
a memory storing program instructions that cause the processor to:
calculate a value of an index indicating a quality of experience of a viewer for each of a plurality of encoded videos generated by encoding an original video by a plurality of combinations of values of encoding parameters, and derive a relationship between the values of the encoding parameters and the values of the index; and
derive a plurality of possibilities for a combination of values of the encoding parameters to be used for encoding the original video, based on the relationship, wherein the program instructions further cause the processor to
convert time-series data of throughput in a past delivery related to the original video into time-series data of values of the index;
derive values of the index each corresponding to one of the plurality of possibilities based on the time-series data of the values of the index, and
derive the plurality of possibilities based on the derived values of the index and the relationship,
wherein the program instructions further cause the processor to:
convert time-series data of throughput in the past delivery related to the original video into the time-series data of values of the index by substituting bit rate value at each time point of the time-series data of the bit rate that is obtained for each past delivery, for by of expression (1) to calculate a QoE corresponding to the bit rate value, and arranging the obtained QoE at each time point in time series $$Q = c_1 / 1 + e^{-c_2 \times log_{10} bv + c_3} \tag{1}$$

wherein c1, c2, and c3 are constants, and by is the bit rate.

2. The encoding parameter deriving apparatus according to claim 1, wherein the program instructions cause the processor to
derive a distribution of the values of the index based on the time-series data of the values of the index, and
derive the values of the index each corresponding to one of the plurality of possibilities based on the distribution.

3. An encoding parameter deriving method executed by a computer, the encoding parameter deriving method comprising:
calculating a value of an index indicating a quality of experience of a viewer for each of a plurality of encoded videos generated by encoding an original video by a plurality of combinations of values of encoding parameters, and deriving a relationship between the values of the encoding parameters and the values of the index; and
deriving a plurality of possibilities for a combination of values of the encoding parameters to be used for encoding the original video, based on the relationship,
the encoding parameter deriving method further comprising:
converting time-series data of throughput in a past delivery related to the original video into time-series data of values of the index;
deriving values of the index each corresponding to one of the plurality of possibilities based on the time-series data of the values of the index;
deriving the plurality of possibilities based on the derived values of the index—and the relationship, and
converting time-series data of throughput in the past delivery related to the original video into the time-series data of values of the index by substituting bit rate value at each time point of the time-series data of the bit rate that is obtained for each past delivery, for by of expression (1) to calculate a QoE corresponding to the bit rate value, and arranging the obtained QoE at each time point in time series $$Q = c_1 / 1 + e^{-c_2 \times log_{10} bv + c_3} \tag{1}$$

wherein c1, c2, and c3 are constants, and by is the bit rate.

4. The encoding parameter deriving method according to claim 3, executed by the computer, the encoding parameter deriving method comprising:
deriving a distribution of the values of the index based on the time-series data of the values of the index; and
deriving the values of the index each corresponding to one of the plurality of possibilities based on the distribution.

5. A non-transitory computer-readable recording medium storing a program for causing a computer to execute the encoding parameter deriving method according to claim 3.

* * * * *